H. B. BARRIER.
PHOTOGRAPHIC ROLL HOLDER.
APPLICATION FILED NOV. 12, 1913.
1,140,099.
Patented May 18, 1915.
2 SHEETS—SHEET 1.
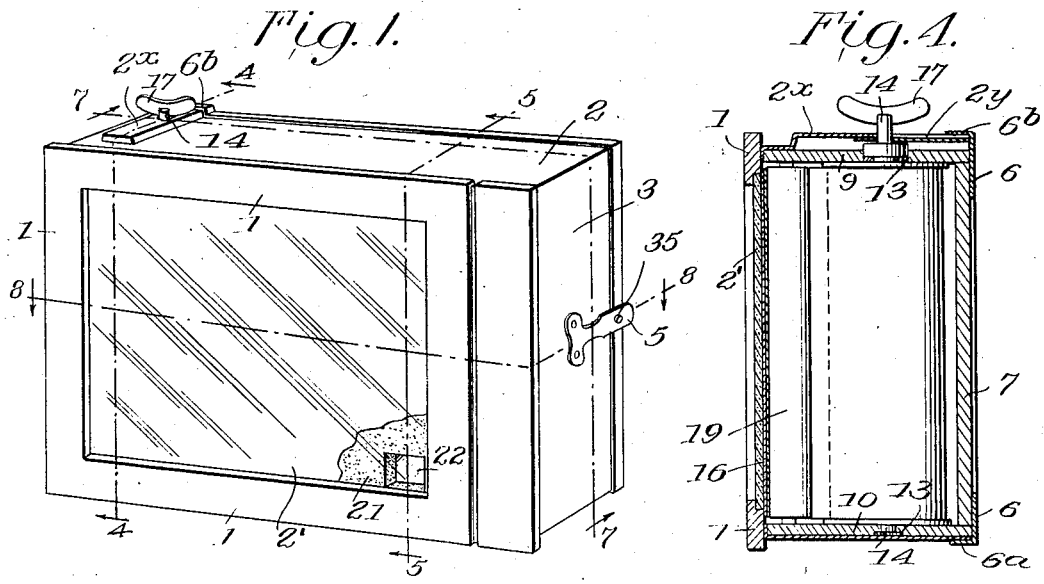
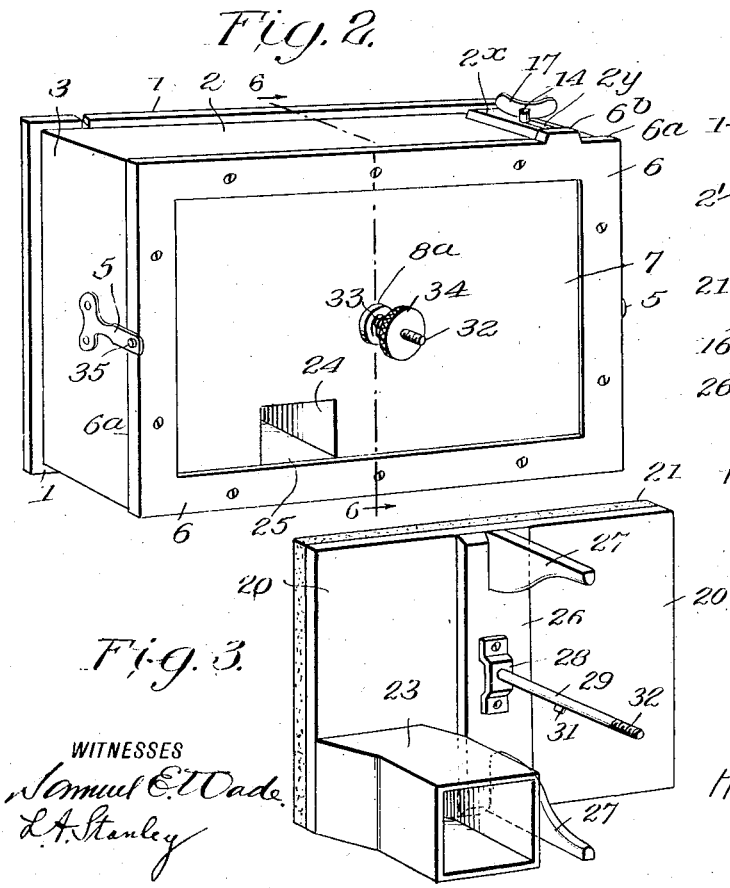
WITNESSES
INVENTOR
HORACE B. BARRIER
BY Munn & Co.
ATTORNEYS H. B. BARRIER.
PHOTOGRAPHIC ROLL HOLDER.
APPLICATION FILED NOV. 12, 1913.
1,140,099.
Patented May 18, 1915.
2 SHEETS—SHEET 2.
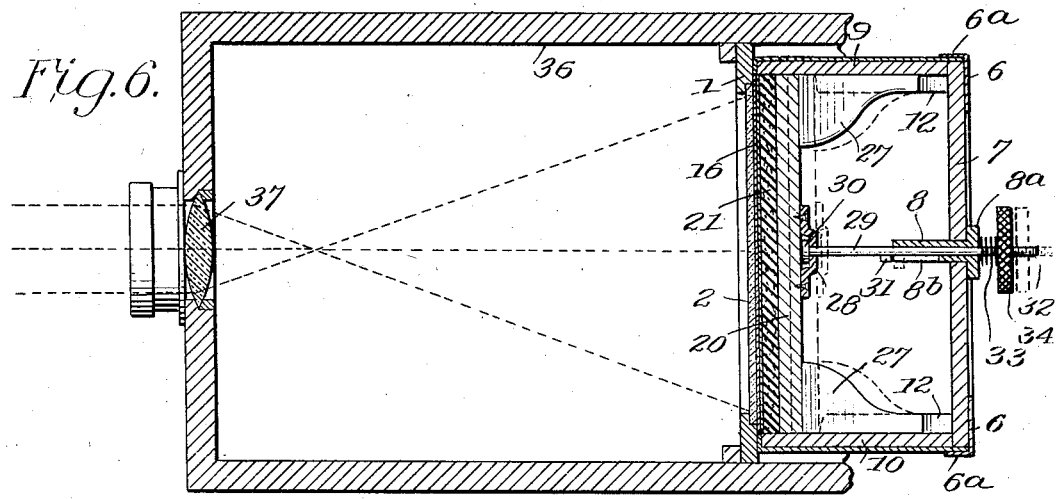
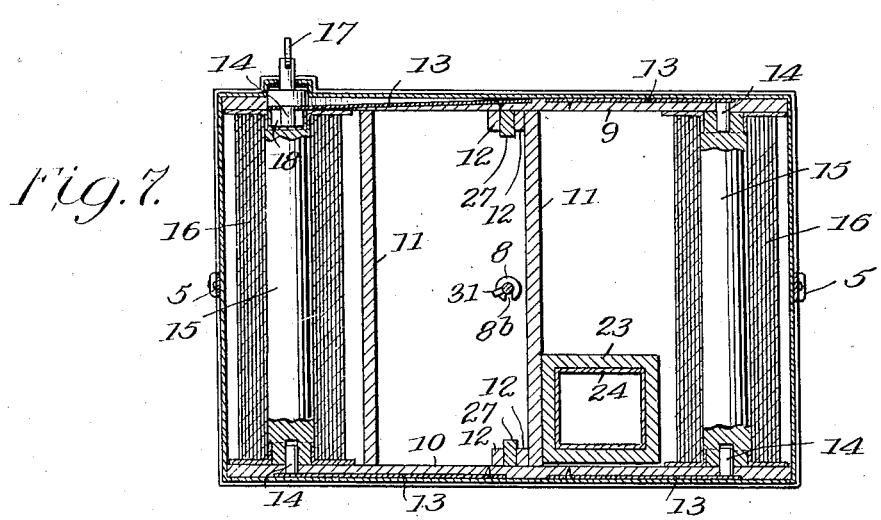
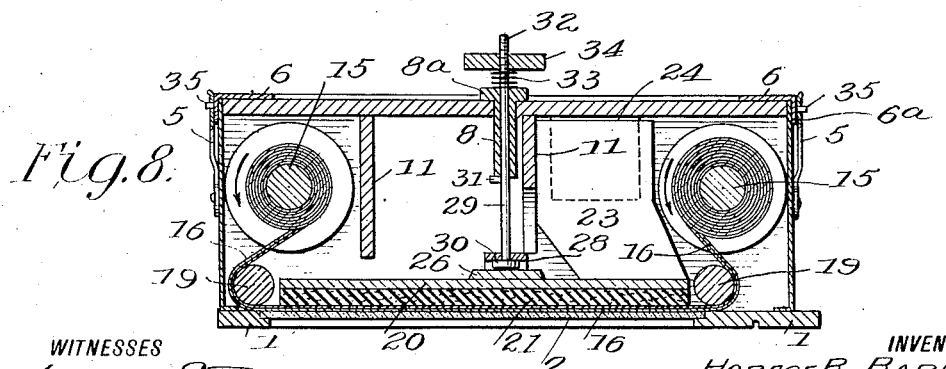
WITNESSES
Samuel E. Wade.
L. A. Stanley
INVENTOR
HORACE B. BARRIER
BY Munn & Co.
ATTORNEYS

UNITED STATES PATENT OFFICE.

HORACE B. BARRIER, OF SPOKANE, WASHINGTON.

PHOTOGRAPHIC-ROLL HOLDER.

1,140,099.     Specification of Letters Patent.     Patented May 18, 1915.

Application filed November 12, 1913. Serial No. 800,492.

*To all whom it may concern:*

Be it known that I, HORACE B. BARRIER, a citizen of the United States, and a resident of Spokane, in the county of Spokane and State of Washington, have made certain new and useful Improvements in Photographic-Roll Holders, of which the following is a specification.

My invention relates to improvements in attachments for cameras, more particularly in means for holding films flat, and it consists in the combinations, constructions and arrangements herein described and claimed.

An object of my invention, as stated above, is to provide a device which may be attached to a camera box, and which is designed to hold films with means for pressing the films out flat when exposure is made and for releasing them and permitting their ready movement when shifting from one portion of the film to the other.

A further object of my invention is to provide a simple mechanism for holding and pressing the film which requires very little manipulation on the part of the operator.

Other objects and advantages will appear in the following specification and the novel features of the device will be particularly pointed out in the appended claims.

My invention is illustrated in the accompanying drawings forming part of this application in which—

Figure 1 is a perspective view of the device as viewed from the front, Fig. 2 is a perspective view as viewed from the rear, Fig. 3 is a perspective view of the rear side of the presser plate, Fig. 4 is a section on line 4—4 of Fig. 1, Fig. 5 is a section on the line 5—5 of Fig. 1, Fig. 6 is a section along the line 6—6 of Fig. 2, Fig. 7 is a section along the line 7—7 of Fig. 1, and Fig. 8 is a section along the line 8—8 of Fig. 1.

One of the disadvantages of using films in the ordinary camera is that the edges of the films are apt to be out of the focal plane of the lens and as a consequence the edges of the films are apt to be blurred while the centers of the films may be in perfect focus. On account of this, professional photographers and other workers in the photographic arts, who take pride in making high class pictures, prefer to use glass plates.

The device which forms the subject of the present invention is designed to permit the use of films in high class photography. To this end I provide a container or film holder consisting substantially of three major portions—a glass holder, a roll holder, and a presser plate. Referring now particularly to Figs. 1 and 5 it will be seen that I have provided a rectangular frame portion 1 which is grooved to receive a plate of clear, transparent glass 2′. The frame 1 is preferably made of wood, although it may be made of metal or other suitable material. Secured to the frame 1 are the side and end portions 2 and 3 respectively. The end portions 3 bear perforated leaf springs 5 which serve as locking members, as will be explained later. On one of the side portions 2 is a raised extension $2^x$ which is provided with a slot $2^y$ (see Figs. 2 and 4).

The roll holder consists of a rectangular metal frame portion 6 having inwardly turned flanges $6^a$, one of the flanges having an extension $6^b$ arranged to cover the end of the extension $2^x$, as shown in the drawings. A plate 7 of wood or other suitable material is secured to the rectangular portion 6 and is provided with a central opening in which is disposed a sleeve 8 having a head $8^a$ arranged to engage the outer rear side of the plate 7 and being provided with a longitudinal slot $8^b$ extending rearwardly from the inner end, as clearly seen in Fig. 6.

Secured to the member 7 and forming an integral part thereof are the side members 9 and 10 which are connected together by means of braces 11 (see Figs. 7 and 8). Both the side members 9 and 10 have guide strips 12 (see Figs. 6 and 7) whose purpose will be explained later. Both of the side members 9 and 10 are provided on their exterior portions with leaf springs 13 (see Fig. 7) which bear at their ends pivot pins 14 which are arranged to extend through openings in the members 9 and 10, so as to form journals for the spools 15 which contain the films 16. One of these pins, *i. e.*, the pin in the upper left hand corner shown in Fig. 7, is rotatable in its spring 13, and is provided with a thumb piece 17 at one end and a lug 18 arranged to enter the recess in the spool for rotating the latter. Rollers 19 are journaled between the side members 9 and 10 around which the film is designed to pass.

The presser plate is best shown in Fig. 3. It consists of a rigid backing 20 of wood or similar material having secured to it a pad of rubber sponge 21 or other resilient material. At one corner of the presser plate is a square of ruby glass 22 (see Fig. 5) which is surrounded by a tube 23 extending rearwardly and being arranged to telescope a tube 24 which is carried by the rear plate 7, the latter tube terminating in an opening 25, as clearly shown in Figs. 2 and 5.

The presser plate bears a central rib 26 to which is secured rearwardly extending guide members 27 arranged to enter between the guide members 12 (see Fig. 7). The rib 26 is provided with a U-shaped bracket 28 in which is journaled a spindle 29 (see Figs. 3 and 8) having a head 30 held between the bracket 28 and the body portion of the rib 26. The spindle 29 has a laterally extending lug 31 and is provided at its end with a threaded portion 32.

The device is assembled by drawing the end 32 of the spindle 29 into the sleeve 8, the guide members 27 entering between the members 12. The spindle may now be rotated until the lug 31 enters the slot 8$^b$ in the sleeve 8. A spiral spring 33 (see Figs. 5 and 6) is placed on the end of the spindle 29 and a thumb nut 34 is screwed on the end 32 as far as it will go. The presser plate is now held by the roll holder. A roll of films may be inserted by pulling outwardly on the springs 13. After the roll is inserted the springs upon release will enter the openings in the spool, so as to hold the film in place. One end of the film is now brought around the nearest roller 19, across the face of the pad 21, and is attached to the other roller in the usual manner, with this exception that the sensitive side of the film, of course, is away from the pad, the paper backing which accompanies the film being next to the pad so that the number of the exposure may be read through the ruby glass at the corner of the pad. The film holder which contains the pressure plate is now slipped into that part which contains the transparent plate, the winding pin entering the slot 6$^b$ and the flanges 6$^a$ being pushed over the ends and sides of the portions 3 and 2 of the glass plate holder. The leaf springs 5 will now spring into position over the pins 35 (see Figs. 1 and 2) thus holding the parts in position.

The holder set up as described is designed to be applied to any camera such as the Graflex. In Fig. 6 I have shown the holder as applied to a camera having a box 36 and lens 37. The manner in which the holder is attached to the camera forms no part of the present invention it being obvious that it may be secured in any convenient manner. It is necessary, however, that the inner face of the glass plate against which the film is designed to be pressed shall be in the focal plane of the lens. Now when it is desired to expose the film it is wound off in the usual manner. It will be observed that the spring 33 holds the presser plate away from the glass during the winding of the film. When that portion of the film to be exposed has been brought into position as may be observed through the opening 25 in the rear of the device the nut 34 is grasped and pushed upwardly, i. e., toward the glass plate. This will compress the spring and will cause a longitudinal movement of the spindle 29, so as to bring the lug 31 (see Fig. 6) out of the slot 8$^b$. The nut is now rotated to the right. Since it is on the threaded portion as far as it will go it will tend to rotate the spindle so as to bring the lug 31 out of alinement with the slot into some such position as that shown in Fig. 7. The presser plate now firmly clamps the film against the plate so that every part of the film is in the focal plane of the lens. The exposure is now taken and after exposure the nut 34 is turned toward the right until the lug 31 comes again into alinement with the slot 8$^b$ whereupon the spring 33 will force the spindle outwardly and withdraw the presser plate from the film, thereby leaving the latter and the paper backing which accompanies the film free to move over the rollers 19. The film is now wound so as to bring portion number 2 into position for a second exposure. It will be observed that the film is in no danger of being scratched on the surface of the plate since it is perfectly free to move on the rollers. Prior to the second exposure the nut is pressed inwardly and rotated slightly so as to force the presser plate against the paper and film, thereby holding the latter for the exposure.

When it is necessary to renew the film or to remove it for any purpose, the spring locking members 5 are withdrawn from the pins 35 and the roll holder is pulled out from the glass holder. The pivot springs 13 may then be raised by inserting the finger nails underneath their ends and pulling outwardly when the rolls may be removed.

I claim:—

1. In an attachment for photographic cameras, a container, a glass plate carried by the container in one of the outer walls thereof, a film roll rotatably mounted in said container, a winding roll, guide rollers, a presser plate disposed between the guide rollers and movable toward and away from the glass plate, said film being arranged to pass between said presser plate and said glass plate, means for locking said presser plate in engagement with said films, said last named means comprising a slidable rod having one end swiveled to said presser plate, a slotted sleeve carried by a wall of the container and arranged to receive the rod, a lug carried by said slidable rod and arranged to enter the slot in said sleeve, and means carried by one end of the rod for permitting the latter to be forced toward the plate, the movement of the rod toward the plate serving to bring the lug out of the slot, and the rotation of the rod serving to cause the lug to engage the end of the sleeve, thereby locking the pressure plate in position.

2. In an attachment for photographic cameras, a container, a glass plate carried by the container in one of the outer walls thereof, a film roll rotatably mounted in said container, a winding roll, guide rollers, a presser plate disposed between the guide rollers and movable toward and away from the glass plate, said film being arranged to pass between said presser plate and said glass plate, means for locking said presser plate in engagement with said films, said last named means comprising a slidable rod having one end swiveled to said presser plate, a slotted sleeve carried by a wall of the container and arranged to receive the rod, a lug carried by said slidable rod and arranged to enter the slot in said sleeve, a thumb nut carried by the rod for reciprocating and rotating the latter, the movement of the rod toward the glass plate serving to bring the lug out of the slot in the sleeve, and the subsequent rotation of the thumb nut and rod serving to bring the lug into engagement with the end of the sleeve thereby locking the presser plate in position, and a spring disposed between said thumb nut and the end of the sleeve for automatically releasing the presser plate when the lug is in alinement with the slot in the sleeve.

3. In an attachment for photographic cameras, a container, a glass plate carried by the container in one of the outer walls thereof, a film roll rotatably mounted in said container, a winding roll, guide rollers, a presser plate disposed between the guide rolls and movable toward and away from the glass plate, said film being arranged to pass between said presser plate and said glass plate, means for locking said presser plate in engagement with said film, said last named means comprising a slidable rod having one end swiveled to said presser plate, a slotted sleeve carried by the wall of the container and arranged to receive the rod, and means carried by the rod and arranged to engage a portion of the sleeve during the movement of the rod for locking the latter to the sleeve.

HORACE B. BARRIER.

Witnesses:
  ROY STRONG,
  E. STOUT.